US008813202B2

(12) United States Patent
Wang et al.

(10) Patent No.: US 8,813,202 B2
(45) Date of Patent: Aug. 19, 2014

(54) MECHANISM TO DETERMINE SOURCE DEVICE SERVICE TIER BASED ON THE VERSION OF THE HDCP KEY

(75) Inventors: Yequing Wang, Horsham, PA (US); Patrick J. Leary, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 123 days.

(21) Appl. No.: 13/342,223

(22) Filed: Jan. 3, 2012

(65) Prior Publication Data
US 2013/0174238 A1 Jul. 4, 2013

(51) Int. Cl.
H04L 9/32 (2006.01)
H04N 21/258 (2011.01)
H04N 21/4367 (2011.01)
H04N 21/436 (2011.01)

(52) U.S. Cl.
CPC ...... *H04N 21/25816* (2013.01); *H04N 21/2585* (2013.01); *H04N 21/4367* (2013.01); *H04N 21/43615* (2013.01)
USPC .......................................................... 726/7

(58) Field of Classification Search
CPC .................. H04N 21/25816; H04N 21/2585; H04N 21/43615; H04N 21/443; H04N 21/835; H04N 21/4367
USPC .......................................................... 726/7
See application file for complete search history.

(56) References Cited

U.S. PATENT DOCUMENTS

| 6,782,476 B1 * | 8/2004 | Ishibashi | 713/169 |
| 2004/0162785 A1 * | 8/2004 | Stone | 705/57 |
| 2007/0274689 A1 | 11/2007 | Stone | |
| 2009/0178086 A1 * | 7/2009 | Unger | 725/81 |
| 2009/0251605 A1 | 10/2009 | Hsiao | |

FOREIGN PATENT DOCUMENTS

| EP | 1517543 A2 | 3/2005 |
| EP | 2315408 A2 | 4/2011 |

OTHER PUBLICATIONS

PCT Search Report & Written Opinion, RE: Application #PCT/US2012/072281, May 27, 2013.
"High-bandwidth Digital Content Protection System v1.3 Amendment for DisplayPort", Rev. 1.1, Digital Content Protection LLC, 84 pages, Jan. 15, 2010.
"High-bandwidth Digital Content Protection System Interface Independent Adaptation Revision 2.1", Digital Content Protection LLC, 72 pages, Jul. 18, 2011.

(Continued)

*Primary Examiner* — Kambiz Zand
*Assistant Examiner* — Aubrey Wyszynski
(74) *Attorney, Agent, or Firm* — Lori Anne D. Swanson

(57) ABSTRACT

A source device and method for authenticating a sink device. The source device and method include detecting when the sink device connects to a communication interface and in response to detecting a connected sink device, activating a sink device authentication protocol which authenticates whether the connected sink device is an approved sink device for connecting via the communication interface. The source device determines a level of authentication of the connected sink device from among a first-level authentication and a second-level authentication based on first and second authentication components, respectively derived from different master keys, which affects the type of content provided to the sink device. Responsive to the level of authentication provided through the connected sink device, modifying the content transmitted to the connected sink device, and preventing transfer of any content from the source device to the sink device in response to the sink device not being authenticated.

20 Claims, 6 Drawing Sheets

(56) References Cited

OTHER PUBLICATIONS

"High-bandwidth Digital Content Protection System Mapping HDCP to WirelessHD Revision 2.0", Digital Content Protection LLC, 64 pages, Jan. 19, 2010.

HDCP Master Key for Blu-Ray and HD Video Encryption Leaked, http://www.mydigitallife.info/hdcp-master-key-for-blu-ray-and-hd-video-encryption-leaked/, Sep. 20, 2010, all pages.

NEOHAPSIS: Security Blog, http://labs.neohapsis.com/2010/11/18/what-about-this-hdcp-crack/, Nov. 18, 2010, all pages.

\* cited by examiner

MECHANISM TO DETERMINE SOURCE DEVICE SERVICE TIER BASED ON THE VERSION OF THE HDCP KEY

BACKGROUND OF THE INVENTION

1. Technical Field

The present invention relates generally to source devices that provide multimedia content to one or more sink devices, and in particular to authentication protocols for enabling source devices to authenticate one or more sink devices for content distribution.

2. Description of the Related Art

High-bandwidth Digital Content Protection (HDCP) is a copy protection system and/or protocol that prevent the streaming or copying of high quality digital audio and video data. The data, which is typically transmitted via a Display Port, a High-Definition Multimedia Interface (HDMI), and/or a Digital Visual Interface (DVI), is protected by the use of a HDCP master key. The HDCP master key is proprietary in nature and until recently has been unique in the industry. However, the privacy of the HDCP master key has become compromised.

Digital Content Protection (DCP), the HDCP licensing company, controls the use of the HDCP master key. DCP utilizes the HDCP master key to generate the private keys utilized in all HDCP devices. Each HDCP device, whether a source device or a sink device, has its own private key which is maintained within the electronic circuitry of the device. The private keys are generated from a single master key. The use of the correct source and sink private keys enables each source/sink pair to successfully decrypt data sent from source to sink during the source—sink handshake. Content can only be transmitted once this handshake is completed, i.e., the sink device is properly authenticated. With knowledge of the HDCP master key being compromised, audio and video pirates are now more equipped to create illegal high-quality digital copies of high definition video.

BRIEF DESCRIPTION OF THE DRAWINGS

The following detailed description of illustrative embodiments can best be understood when read in conjunction with the accompanying drawings, wherein.

DETAILED DESCRIPTION OF ILLUSTRATIVE EMBODIMENTS

Figure 1:
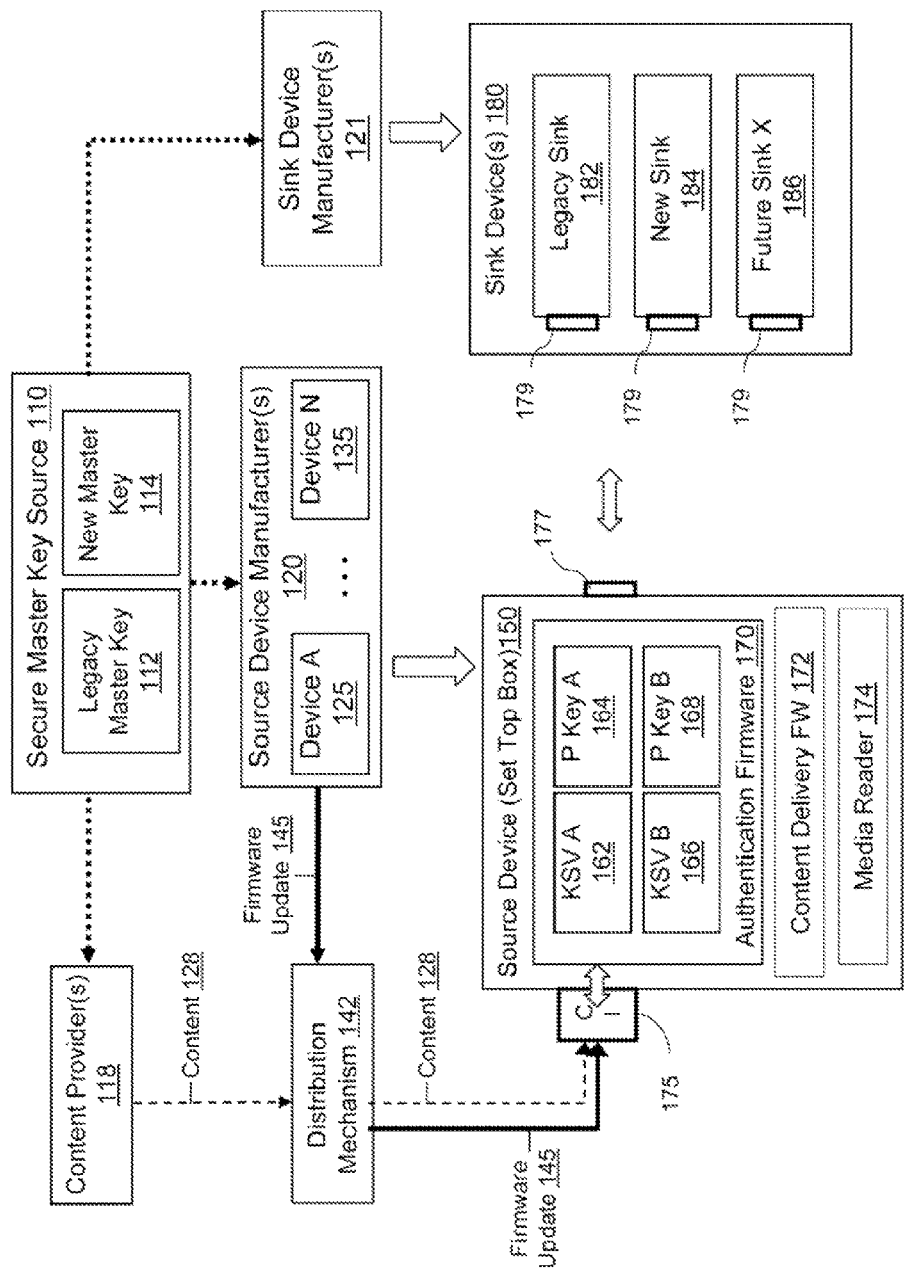
FIG. 1 is an exemplary diagram of a High-bandwidth Digital Content Protection (HDCP) communication system with end user source device and sink device in accordance with one embodiment.

The described and illustrative embodiments provide a source device comprising: a processor and a persistent storage having stored therein at least a first set of sink device verification parameters derived from a legacy version of a secure proprietary resource and a second set of sink device verification parameters derived from a newer version of the secure proprietary resource. The secure proprietary resource is utilized to enable the prevention of content transmission from the source device to a sink device that has not been authorized to receive such content. The source device further comprises: a first communication interface coupled to the processor by which one or more sink devices can connect to the source device and which receives, from a connected sink device, handshake credentials, including sink device identifying data, during an initial handshake with the connected sink device; and authentication firmware that executes on the processor and which performs the initial handshake with a connected sink device and, in response to receiving from the sink device a set of handshake credentials that include verifiable handshake data that was derived from at least one of the secure proprietary resource, automatically approves the connected sink device to receive content from the source device. The source device further comprises content delivery firmware that executes on the processor and which determines a service tier for content delivery to an approved, connected sink device based on the version of the secure proprietary resource from which the verified handshake data of the connected sink device was derived. At least one of (a) content protected via the new version of the secure proprietary resource and (b) certain advanced features of all content are prevented from being transmitted to the approved, connected sink device in response to the service tier for content delivery being a first service tier associated with the legacy version of the secure proprietary resource.

Other embodiments provide a method comprising: detecting when a sink device connects to the first communication interface; and in response to detecting a connected sink device, the processor executing the firmware and initiating a handshake authentication by which the source device verifies whether the connected sink device is an approved sink device for receiving content from the source device via the first communication interface. The handshake authentication comprises the processor verifying that handshake credentials received from the sink device for completing the handshake with the source device including verifiable handshake data that was derived from one of at least two different versions of a secure proprietary resource that is utilized to enable a source device to restrict which sink devices can receive content from the source device. The method also comprises: responsive to the connected sink device being verified as an approved sink device to receive content via the first communication interface, the processor performs the function of determining a service tier for content delivery to the approved, connected sink device based on the version of the secure proprietary resource from which the verified handshake data of the connected sink device was derived. At least one of (a) content protected via a newer version of the secure proprietary resource and (b) certain advanced features of all content are prevented from being transmitted to the approved, connected sink device in response to the service tier for content delivery being a first service tier that is associated with a legacy version of the secure proprietary resource.

One implementation provides a programmable High-bandwidth Digital Content Protection (HDCP) source device and method for enabling (a) selective authentication by the HDCP source device of one or more HDCP sink devices and (b) select transmission of first type content and/or second type content based on a master key (MKey) source of High-Definition Multimedia Interface (HDMI) and/or Digital Visual Interface (DVI) handshake credentials provided by the sink device during source-sink device handshake. Specifically, the embodiments include the source device enabling distribution of specific types of HDCP content from the source device to the sink device based on whether the sink device completes a successful handshake utilizing first type HDMI/DVI handshake credentials, derived from a first HDCP master key, and/or utilizing second type HDMI/DVI handshake credentials, derived from a second HDCP master key.

The source device and method include detecting when the sink device connects to a communication interface of the source device and, in response to detecting a connected sink device, activating a sink device handshake authentication protocol, or sink device handshake, which authenticates whether the connected sink device is an approved sink device for connecting via the communication interface. An approved sink device is one that provides one or more of a first type and/or a second type handshake credentials that were respectively derived from one of a first, legacy master key and a second, new master key. Approval of the sink device comprises authentication firmware of the source device comparing the handshake credentials against authentication credentials that are also derived from the same master key.

The source device also determines a type of authentication of the connected sink device from among a first type authentication and a second type authentication, corresponding to whether the sink device completed the handshake with a first type handshake credential or a second type handshake credential. Responsive to the determined type of authentication of the connected sink device, the source device determines which content (of multiple types of content) and what characteristics of provided content can be transmitted to and/or is supported by the connected sink device. In response to the sink device providing only the first type handshake credential to perform the handshake, the source device prevents transfer of certain content to the sink device and/or prevents the sink device from receiving certain content characteristics that are not supported by sink devices that do not have the second type authentication credentials. However, for sink devices that are authenticated via the second type handshake credential, all content and content characteristics can be provided to the sink devices. In response to the sink device not being authenticated, as would occur when the sink device does not provide either the first type or the second type handshake credentials, the source device terminates the connection and prevents any content from being transmitted to the sink device.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term set top box (also known as set-top box (STB) and set top unit (STU)) is a type of source device. The source device is an electronic device that connects to a sink device and an external signal source. The source device turns an incoming signal into content, which is presented on the sink device.

With reference now to the figures, FIG. 1 depicts a block diagram representation of a complete HDCP communication system 100. HDCP communication system 100 comprises a secure master key source 110, such as Digital Content Protection (DCP), the licensing company for HDCP. Secure master key source 110 maintains a first, or legacy, master key 112 and a second, or new, master key 114, which are respectively utilized to provide private keys and other authentication credentials to each source device and sink device that supports HDCP connection and communication protocol. It is appreciated that a larger number of distinct master keys can be maintained by secure master key source 110 and that use of only two master keys within the illustrative and described embodiments is provided solely as an example implementation. As shown, HDCP communication system comprises one or more source device manufacturers 120 (one shown) and one or more sink device manufacturers 121 (one shown), which respectively manufacture source devices and sink devices containing one or more types of device verification credentials, such as HDCP authentication credentials, derived from a secure proprietary resource, such as either legacy master key 112 or new master key 114. Source device manufacturer 120 manufactures a plurality of source devices, of which device A 125 to device N 135 and example source device 150 are illustrated. In the illustrative embodiments, source device 150 is a set top box. Sink device manufacturer 121 manufactures one or more types of end user sink devices, generally grouped and collectively referred to as sink device(s) 180. Three specific type and/or models of sink devices are illustrated, that is, a legacy sink device 182, a new sink device 184, and a future sink device 186 or sink device X, where X represents a future model number or version of sink device. While not explicitly shown, one or more of the legacy sink devices can be manufactured by at least one unauthorized manufacturer, which manufactures these legacy sink devices utilizing authentication credentials derived from a compromised legacy master key (i.e., utilizing an unauthorized decoding and/or distribution of legacy master key). Thus, within the described embodiments, the generation of new master keys, including but not limited to new master key 114, can be triggered by the previous master key version (legacy master key 112) being compromised. The various authentication and content distribution protocols performed by the source device, as described herein, enables the secure master key source 110 to respond to a compromised legacy master key by generating a new master key that will eventually replace the legacy master key in source and sink devices manufactured by authorized manufacturers.

A further extension of HDCP communication system 100 includes one or more content providers 118 (one shown), such as an internet video distributor or cable television company. The one or more content providers 118 distribute various types of content, generally presented as content 128, via any one or more of multiple known types of distribution mechanisms 142 to source devices, e.g., source device 150, for end user consumption via a sink device. The specific type of and functionality provided by distribution mechanism 142 is not an important aspect of the described embodiments. However, the distribution mechanism, including distribution channels, illustrated can, in one embodiment, enable one or more of the secure master key source 110 and the source device manufacturer(s) 120 and/or the content provider 118 to electronically transmit firmware updates 145 related to the new master key 114 to a source device, e.g., source device 150, that is already present at an end-user location, such as at the end user's home or office. Thus, as represented via the dashed arrows, secure master key source 110 can communicate with content provider 118, source device manufacturer 120, and sink device manufacturer 121 to provide updates related to the legacy master key 112 and/or new master key 114.

Source device 150 and sink device(s) 180 are examples of end user devices that can communicate with each other to perform an authentication and/or handshake procedure in which verification parameters of the sink device(s) 180, such as handshake credentials, are presented to the source device 150 and the source device 150 passes or fails a sink device authentication based on whether the specific sink device provides the correct verification parameters, i.e., parameters that were derived from one of a legacy version of a secure proprietary resource, such as the legacy master key 112, and/or a newer version of the secure proprietary resource, such as the new master key 114.

In the described embodiments, two different types of sink device verification parameters and corresponding source device verification parameters can be utilized in a handshake, i.e., be provided by a sink device and verified by the source device. These two types include a first set of verification parameters, which includes first type handshake credentials supplied by a sink device during a handshake and a corresponding first set of source device authentication credentials and which first set of verification parameters are based on or derived from a legacy version of a secure proprietary resource, that is, the legacy master key 112, and second set of verification parameters that includes second type handshake credentials supplied by a sink device during a handshake and a corresponding second set of source device authentication credentials, which second set of verification parameters are based on or derived from a newer version of the secure proprietary resource, that is, the new master key 114.

Source device 150 includes a second communication interface 175 for receiving electronically transmitted content, e.g., content 128, and a first communication interface 177, for example, a high definition multimedia interface (HDMI) peripheral port (also referred to herein as HDMI interface, HDMI port, or HDMI peripheral port 177), which enables a sink device, such as any one of sink device(s) 180, to connect to source device 150. Source device 150 further includes content delivery firmware 172 and sink device authentication firmware 170 and one or more media readers 174. Also illustrated within source device 150 are examples of sink device verification parameters, or authentication credentials, namely a first set of sink device verification parameters comprising a first key select vector (KSV) A 162 and an associated first private key (Pkey) A 164, and a second set of sink device verification parameters comprising a second key select vector KSV B 166 and an associated second private key PKey B 168.

Figure 2:
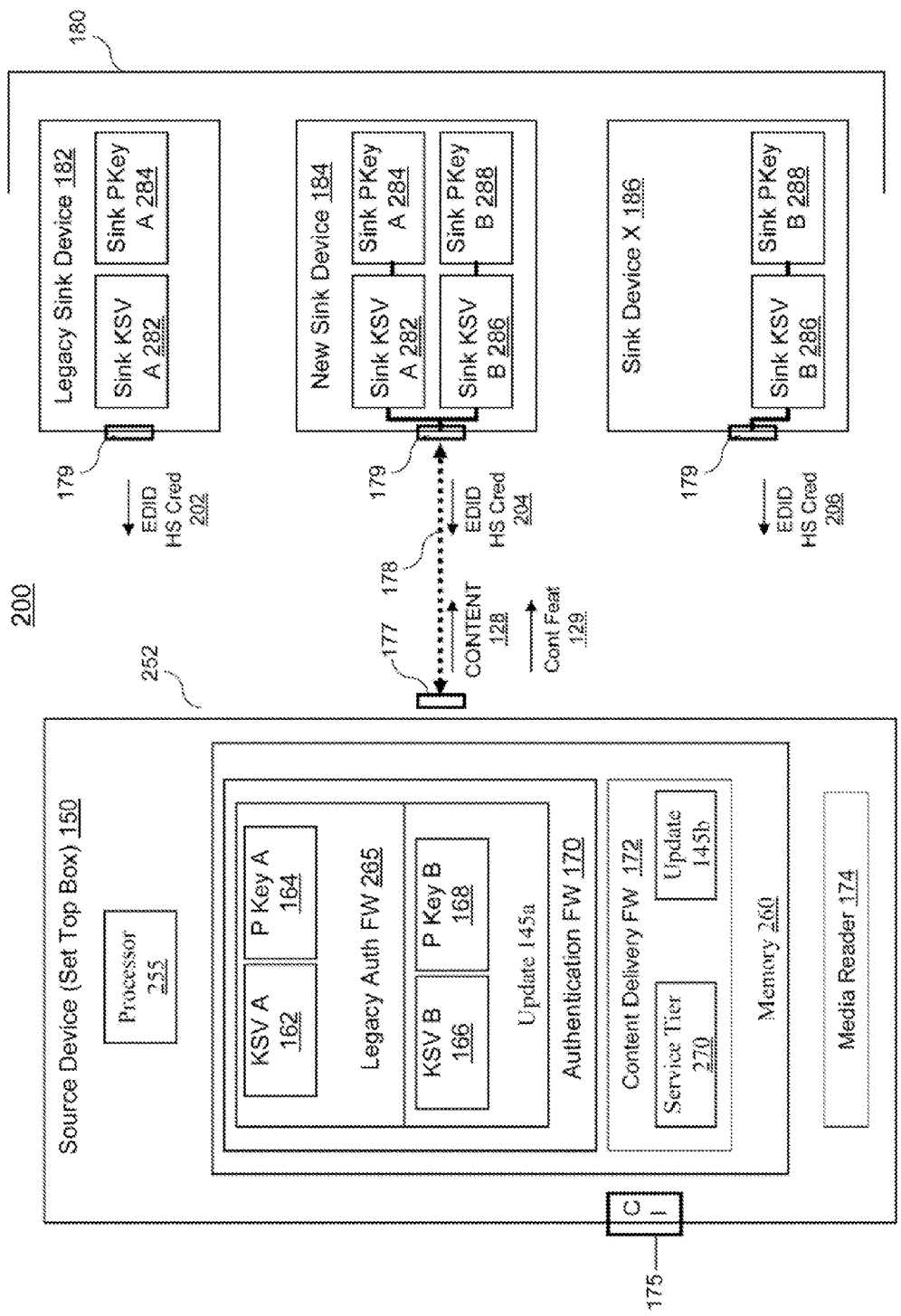
FIG. 2 is an exemplary block diagram providing a more detailed view of an end user source device and multiple different models of sink devices in accordance with one embodiment.

FIG. 2 is a block diagram representation of source device 150 and sink device(s) 180 of HDCP communication system 100, and provides an illustration of the verification parameters within sink device(s) 180. The functionality associated with these verification parameters are generally described within the description of the respective devices and within the remaining description of the embodiments. As illustrated within HDCP communication system 100 and with reference to the more detailed illustration of FIG. 2, source device 150 comprises an external casing 252 and internal electronic circuitry and/or logic and/or executable software modules. The electronic circuitry comprises, among other components, a processing unit or processor 255, such as one or more microprocessors, microcontrollers, digital signal processors (DSPs), combinations thereof or such other devices known to those having ordinary skill in the art, and one or more memory devices 260, such as random access memory (RAM), dynamic random access memory (DRAM), and/or read only memory (ROM) or equivalents thereof, that store data and programs that may be executed by the processor. Several of the other electronic components are not germane to the description and are therefore not explicitly shown or described.

Communication interface 175 of source device 150 receives electronically transmitted content, e.g., content 128, and firmware updates 145a, 145b. Communication interface 175 enables content provider 118, and others, to communicate with source device 150 via distribution mechanism 142. Different types of communication interfaces can be supported by the single source device 150. For example, connection to the communication interface can be via a phone line, a coaxial cable, an Ethernet cable or via a wireless transmitter to a wireless receiver connected to the Internet. HDMI port 177 of source device 150 enables a sink device, such as any one of sink device(s) 180, to connect to source device 150. In one implementation, specific content as well as one or more firmware updates can also be provided to source device 150 via one or more media readers 174. Examples of such media readers comprise a video content recorder (VCR) tape reader, a compact disk (CD) reader digital video disk (DVD) reader, a Bluray reader, and others. These readers receive respective media on which the content is stored and on which firmware updates can be provided, in one embodiment.

Within the electronic circuitry of source device 150, and according to the illustrative embodiments, within the one or more memory devices 260, are software and firmware components and/or data that are executed on processor 255. Among the firmware provided are content delivery firmware 172 and sink device authentication firmware 170. Associated with authentication firmware 170 are two sets of authentication credentials, namely key select vector (KSV) A 162 and associated private key (PKey) A 164, and KSV B 166 and associated PKey B 168. Additionally, within both content delivery firmware 172 and authentication firmware 170 are respective firmware updates 145a, 145b, which represents updates to the respective logic components to enable the source device 150 to support communication with sink devices that provide handshake credentials derived from the new master key 114. Specifically, firmware update 145a, which is packaged with and provides second type authentication credentials, KSV B 166 and PKey B 168, enables authentication firmware 170 to process handshake authentication of new sink device 184 or future sink device 186 presenting the second, new handshake credentials, as opposed to a legacy sink device 182 presenting only the first, legacy handshake credentials. These firmware updates, and particularly firmware update 145b, further enables the source device 150, and specifically content delivery firmware 172, to determine which content can be forwarded to an authenticated or approved sink device and what content characteristics are supported by the authenticated or approved sink device.

In the described embodiment, the one or more memory devices 260 includes secure persistent storage within which is stored the first key select vector KSV A 162 and the corresponding first private key PKey A 164, which are utilized to authenticate a first group of sink devices, for instance, legacy sink device 182 and/or new sink device 184. Once the authentication firmware 170 has been updated, the secure persistent storage then also maintains the second key select vector KSV B 166 and the corresponding second private key PKey B 168, which are utilized to authenticate a second group of sink devices, such as new sink device 184 and sink device X 186. The one or more memory devices 260 further includes a register 270 in which source device 150 maintains an indication of a service tier that is authorized for each sink device 180, that is, a service level or tier authorized for, or type of authentication associated with, the sink device.

In one embodiment, a first type handshake or authentication is performed using components derived from the first, legacy master key 112, and a second type handshake or authentication is performed using components derived from the second, new master key 114. Thus, KSV A 162 and the corresponding PKey A 164, are generated/derived from legacy master key 112, while KSV B 166 and the corresponding PKey B 168 are generated/derived from new master key 114.

Source device 150 is illustrated connected to each sink device(s) 180 via HDMI port 177 of source device 150, a corresponding interface, or port, 179 of the sink device, such as a sink device HDMI peripheral port corresponding to an HDMI peripheral port of the source device, and an intermediate communication medium 178, such as an HDMI interface cable. It is understood that the illustrated HDMI ports 177, 179 are in turn connected to the integrated circuitry of source device 150 and each sink device 180, respectively. Also, while the embodiments herein are described from the perspective of HDCP and HDMI communication system, it is appreciated that aspects of the described embodiments are applicable to other types of secure communication protocols and communication systems that utilize specific types of connection ports that enable completion of a handshake between connected devices. The combination of HDMI peripheral ports 177 and 179 and HDMI interface cable 178 provides a communication interface over which verification parameters, such as sink device handshake credentials, including sink device identifying and authenticating data, are transmitted from a connected sink device 180, and approved content can be transmitted from the source device 150 to each connected, and properly authenticated, sink device 180. Additionally, source device 150 receives authentication components and identifying data from each sink device 180, and transmits approved content to new sink device 180 via HDMI peripheral ports 177 and 179 and HDMI interface cable 178.

Within the figures, three different types and/or models of sink devices are illustrated within the grouping of sink devices 180, as being provided by the one or more sink device manufacturers 121. These models include legacy sink device 182, new sink device 184, and future sink device, or sink device X, 186. The model and/or type of sink device correlates to the type of handshake credentials that are included within the respective sink device for handshake authentication with a source device. The model of sink device therefore is also related to the master key from which the handshake credentials are derived. Thus, as shown by FIG. 2, legacy sink device 182 comprises only a first set of handshake credentials, that is, legacy handshake credentials, that includes a first sink key select vector, sink KSV_A 282, and a first sink private key, sink PKey A 284, that are derived from the legacy master key 112. New sink device 180 comprises both this first set of (legacy) handshake credentials, that is, sink KSV_A 282 and sink PKey A 284, as well as a second set of handshake credentials, that is, new handshake credentials, that includes a second sink key select vector, sink KSV_B 286, and a second sink private key, sink PKey_B 288, that are derived from the new master key 112. Sink Device X 184 comprises only the second set of (new) handshake credentials, that is, sink KSV_B 286 and sink PKey_B 288, but can also contain a future release of such handshake credentials, corresponding to a development of a future version of the master key. These handshake credentials may comprise extended display identification data (EDID) 202, 204, 206. The specific application/functions associated with each of these components and the different sink devices will be described hereafter in greater detail.

With continued reference to FIG. 2, each sink device 180 comprises internal electrical components, such as a display device, for content reproduction and output. These electrical components can include a processor (not shown) and one or more memory devices comprising some persistent memory (also not specifically shown). Within the respective persistent memory are one or more EDID data and one or more types (that is, legacy and/or new) of handshake credentials. These handshake credentials can be packaged for transmission along with the EDID data during initial connection of each sink device 180 to source device 150. Following an initial connection of the sink device 180 to the source device 150, for example, via HDMI peripheral ports, or interfaces, 177 and 179 and HDMI interface cable 178, the sink device initiates a handshake operation with the source device to authenticate the sink-to-source connection.

Thus, legacy sink device 182 requires successful completion of at least a first type authentication handshake before the source device 150 will transmit content to the sink device 182. The first type authentication handshake is completed using EDID data 202 transmitted from legacy sink device 182, which data comprises, or is transmitted along with, first type handshake credentials that are derived from and/or generated utilizing the legacy master key 112. At the source device 150, the first type authentication can be completed by original authentication firmware 265 as well as by an updated authentication firmware, i.e., original authentication firmware 265 enhanced with firmware update 145. For simplicity the updated authentication firmware is generally referred to as authentication firmware 170.

Additionally, before the source device 150 will transmit content to new sink device 184, new sink device 184 initiates a second type authentication handshake, which is completed by the new sink device transmitting to the source device 150 certain EDID data 204, including second type handshake credentials that are derived from and/or generated utilizing the new master key 114. The second type handshake authentication can be completed only via "updated" authentication firmware 170, which includes at least the second type authentication credentials, derived from new master key 114. In one embodiment, completion of a handshake with the second type handshake credentials enables a sink device to access all functionality and be provided with all content available to all legacy sink devices and all new sink devices. However, completion of the handshake with only a first type handshake credentials limits a sink device to specific content and to specific content characteristics approved for that lower level of authentication.

Future sink device 186 also transmits an EDID data 206 during initialization of a connection with source device 150. It is assumed that future sink device 186 would provide at least the second type handshake credentials to complete the handshake. However, future sink device 186 may also possess a next, future set of handshake credentials that are derived from a future version of a master key, which future set of handshake credentials may provide different levels of content protection than provided by the legacy master key 112 and the new master key 114.

In one embodiment, authentication firmware 170, associated with the HDMI interface 177 of source device 150, detects when a sink device is connected to the interface, and in response to detecting the connected sink device, activates a sink device authentication protocol. When authentication firmware 170 detects that one of sink device(s) 180 is connected to source device 150 via HDMI interface 177, authentication firmware 170 activates a sink device handshake authentication protocol. The activated authentication protocol completes a handshake with the sink device and determines whether the connected sink device 180 provides the required authentication credentials to allow the sink device 180 to connect to source device 150, via HDMI interfaces and communication medium 177-179, and receive content from source device 150 over the established connection via HDMI interfaces 177 and 179. Authentication firmware 170 configures source device 150 to support transmitting content to the particular connected sink device 180 only after the connected sink device 180 is authenticated as an approved sink device for connecting via HDMI interface 177.

In another embodiment, content delivery firmware 172 of source device 150 associated with the communication interface (i.e., via HDMI port 177) implements a content protection protocol when a sink device 180 is authenticated to receive content. Content delivery firmware 172, responsive to the authentication of the sink device 180, determines a type of authentication of the sink device. The authentication of sink device 180 can be one of a first-type authentication, or handshake, based on a first master key, that is, legacy master key 112, and a second-type authentication, or handshake, based on a second master key, that is, new master key 114. When the sink device 180 is authenticated via only the first-type authentication, content delivery firmware 172 limits the content transmitted to and the content characteristics supported by sink device 180 to only a first type of content approved for general transmission to all authenticated sink devices. When sink device 180 is authenticated via the second-type authentication, all content and content characteristics, including those additional content and content characteristics that are not available to sink devices, e.g., legacy sink device 182, authenticated via only a first type handshake credentials, are approved to be provided to the sink device 180.

Figure 3:
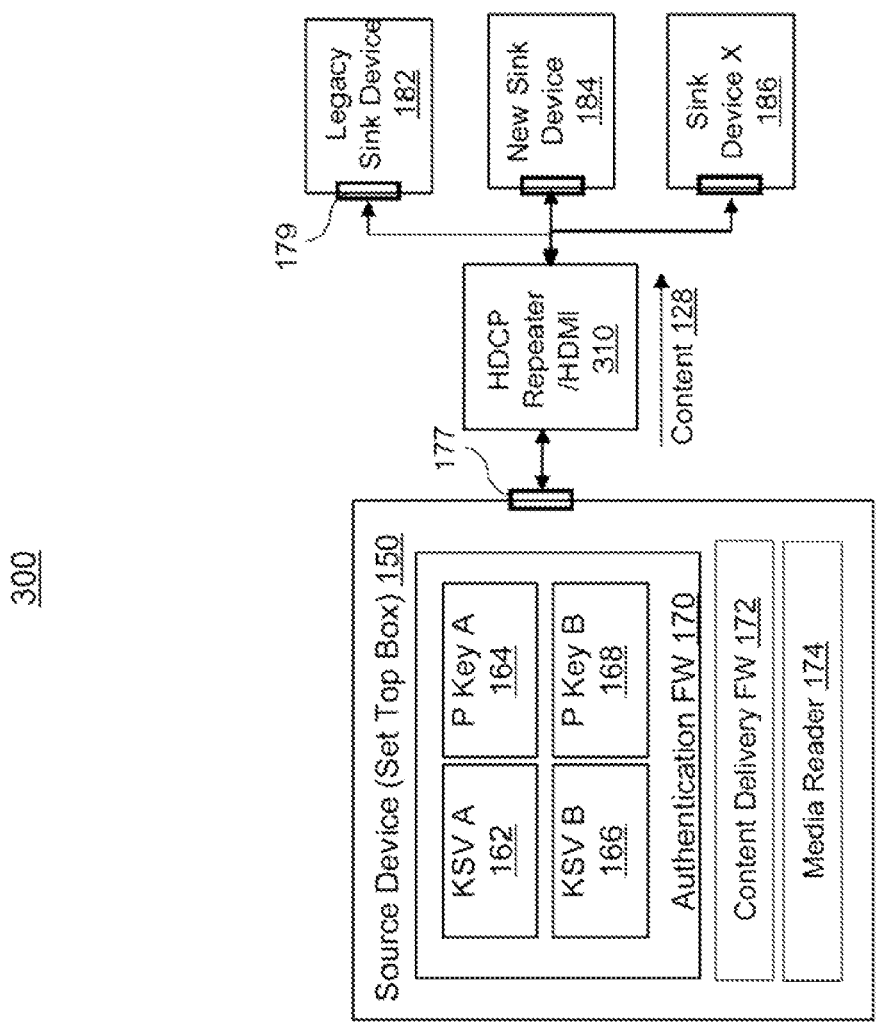
FIG. 3 is a block diagram representation of a source device connected to multiple sink devices via a repeater, according to one embodiment.

In FIGS. 1 and 2, each sink device 180, that is, sink devices 182, 184, and 186, can be directly connected to source device 150 via a HDMI cable linking HDMI interface 177 with a respective sink device HDMI interface 179. Referring now to FIG. 3, an alternate configuration is depicted of the connectivity between source device 150 and a sink device 180. In FIG. 3, each sink device(s) 180, that is, sink devices 182, 184, and 186, is connected to source device 150 via high-bandwidth digital content protection (HDCP) repeater 310. HDCP repeater 310 enables a shared connection between source device 150 and each of sink devices 182, 184, and 186. In the configuration involving use of HDCP repeater 310, authentication can occur via the second type authentication, or handshake, being completed by the new sink device 184 or future sink device 186. When the HDMI is connected to multiple authenticated sink devices via HDCP repeater 310, and at least one sink device was approved based on second type handshake credentials, the content protection protocol transmits all content and enables all content characteristics to all of the multiple authenticated sink devices. Thus, once the second type handshake completes and a new or future sink device, such as sink devices 184 and 186, is authenticated as an approved device, the same content and content characteristics can be made available to all of the sink devices, that is, sink devices 182, 184, and 186, via the HDCP repeater 310, in one embodiment. In another embodiment, functionality of the repeater can be enhanced to restrict or limit specific content and/or content characteristics presented to the legacy sink device 182 while enabling the other sink devices, e.g., new sink device 184, to receive all content 128 and content features, or characteristics, 129.

In yet another embodiment, the content protection protocol implemented by source device 150 may transmit only first-type content to the multiple authenticated sink devices because at least one sink device, that is, legacy sink device 182, lacks the second type handshake credentials. In such an instance, even the new sink device 184 is restricted to receiving only the limited content and/or content characteristics that are supported by the first type handshake credentials.

Source device 150 includes firmware within the integrated circuit that controls operation of source device 150, and provides access to stored authentication credentials to complete the handshake with a connected sink device 180. In one embodiment, source device 150 initially comprises only legacy authentication firmware 265, which supports handshake authentication via legacy authentication credentials, that is, KSV A 162 and PKey A 164. Following the introduction of new master key 114, source device 150 receives a firmware update 145 containing new authentication credentials that are derived from the new master key 114, i.e., KSV B 166 and PKey B 168. Specifically, source device 150 is communicatively connected to a remote firmware provider, such as content provider 118 and/or source device manufacturer 120. In one implementation, firmware update 145 is received via a secure transmission from a trusted firmware provider, which again may be content provider 118 or source device manufacturer 120. Source device 150 receives firmware update 145 via communication interface 175, which includes the new master key update information, that is, the second key select vector, KSV B 166, and the second private key, PKey B 168. Logic associated with source device 150 is automatically updated following the receipt of firmware update 145. That is, source device 150, based on firmware update 145, updates the authentication firmware and content delivery firmware of the source device 150. More particularly, the logic of source device 150 automatically stores the new master key update information, that is, KSV B 166 and PKey B 168, within the secure persistent storage of source device 150. Authentication firmware 170 is updated with additional logic to authenticate sink devices having the handshake credentials corresponding to new master key 114. Content delivery firmware 172 is updated with additional gatekeeper logic to identify specific additional types of content and content characteristics approved for transmission to only those approved sink devices with second type handshake credentials.

Figure 4:
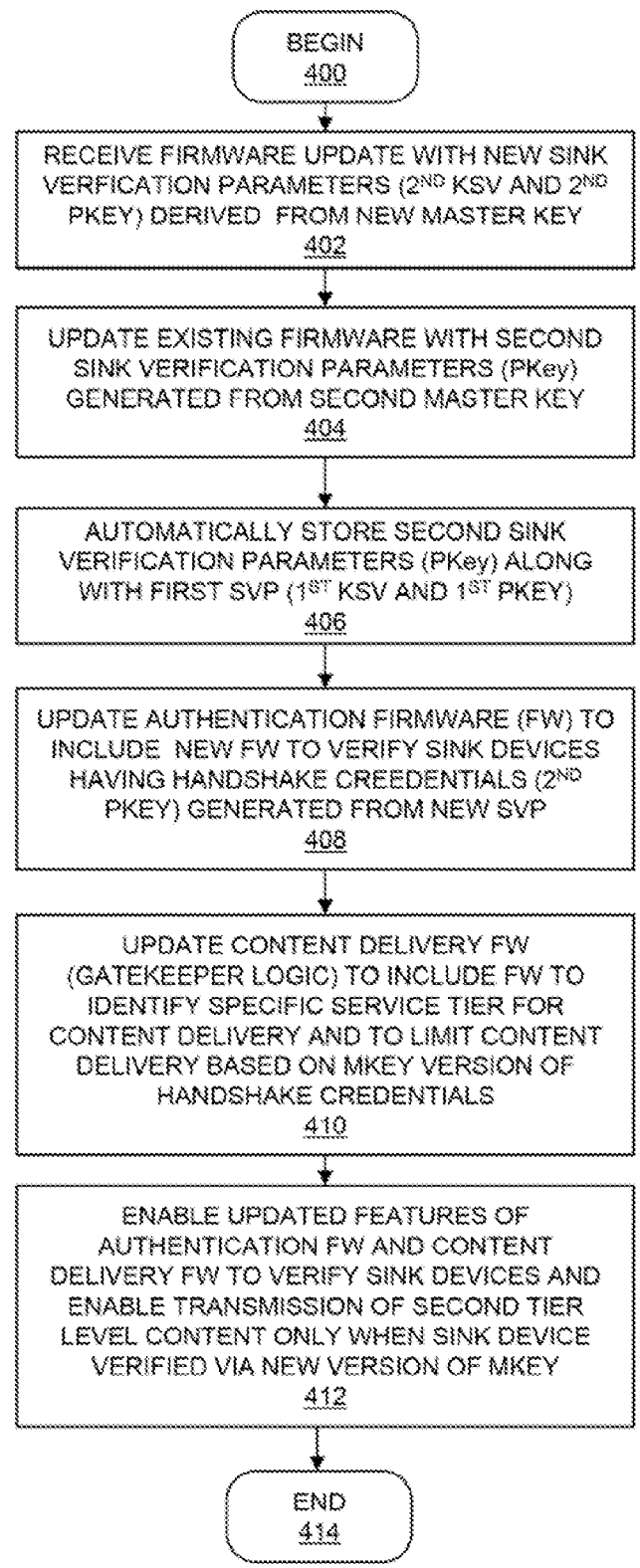
FIG. 4 is a flow chart illustrating the method by which firmware updates containing a second primary key, derived from a second master key, are received by and incorporated into the source device, according to one embodiment.
Figure 5:
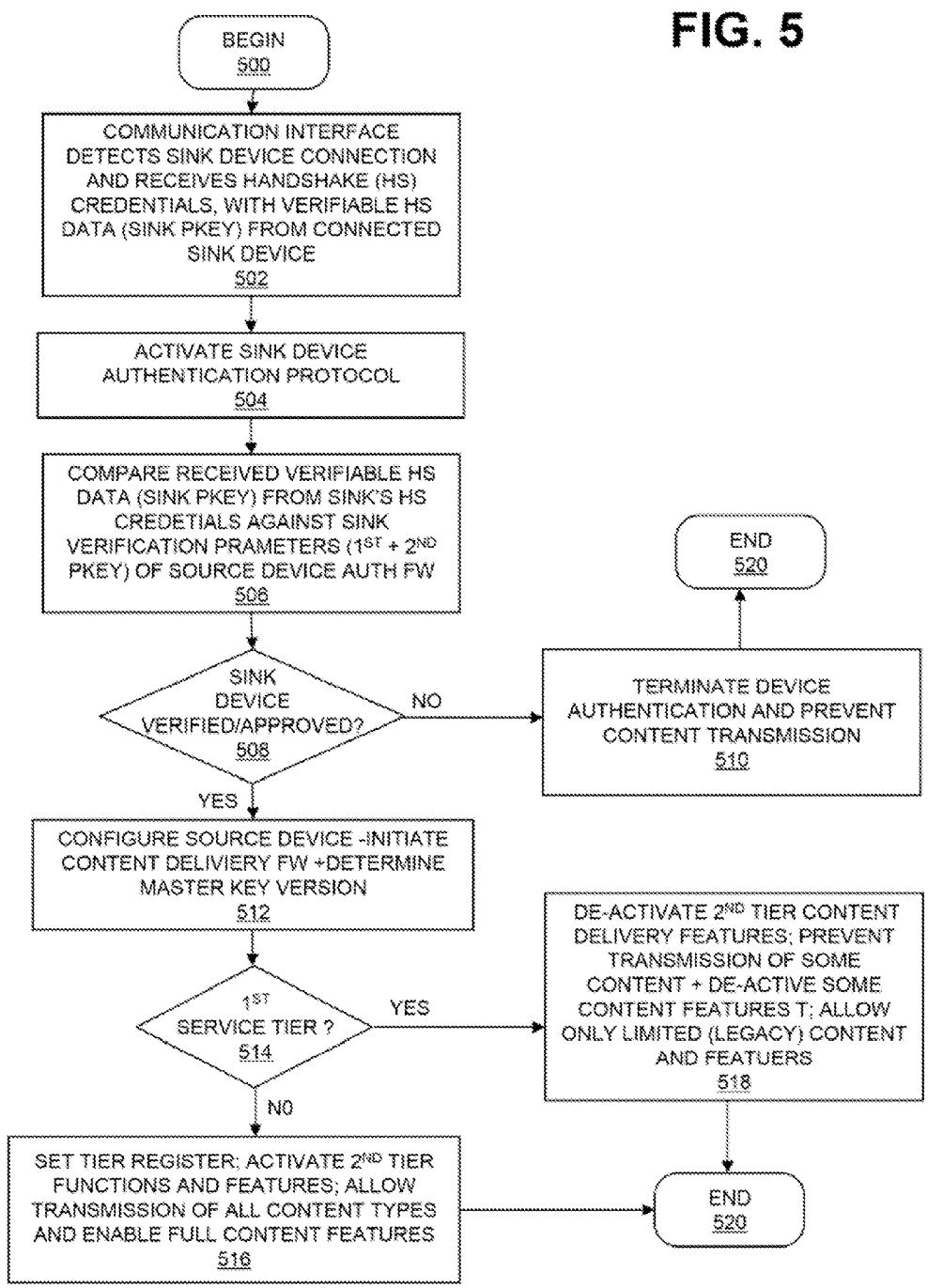
FIG. 5 is a flow chart illustrating a method by which an HDCP sink device authentication process and a content protection protocol are implemented at a source device, in accordance with one embodiment.
Figure 6:
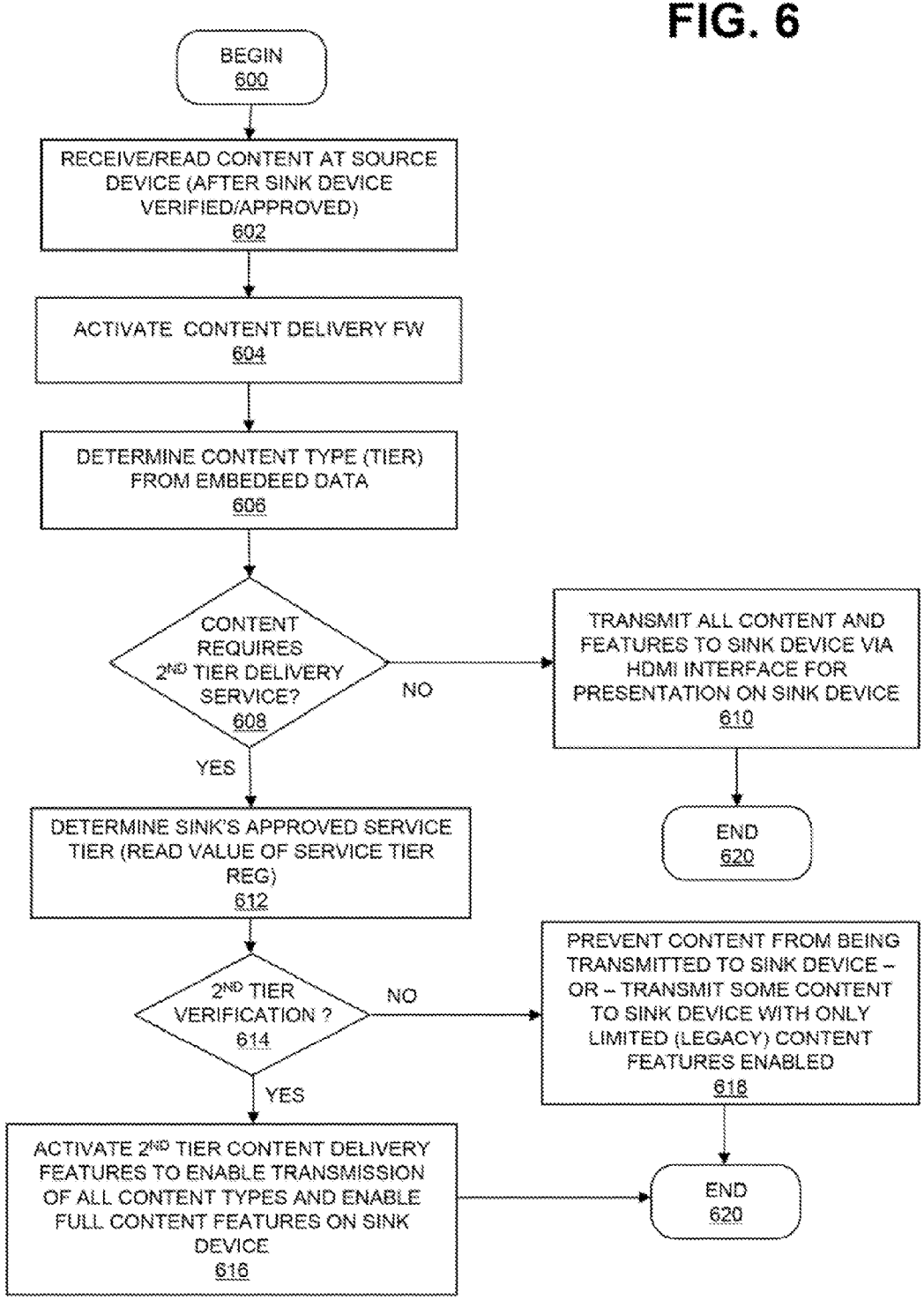
FIG. 6 is a flow chart illustrating the method by which the source device determines a service tier of and which content to present to a connected sink device, according to one embodiment.

Referring now to FIGS. 4-6, flow charts are provided that illustrate various methods by which the above processes of the illustrative embodiments are completed. Although the methods illustrated in FIGS. 4-6 may be described with reference to components shown in FIGS. 1-3, it should be understood that this is merely for convenience and alternative components and/or configurations thereof can be employed when implementing the various methods. Key portions of the methods may be completed by authentication firmware 170 and/or content delivery firmware 172 executing within source device 150 and controlling specific operations on source device 150, and the methods are thus described from the perspective of both authentication firmware 170 or content delivery firmware 172 executing generally within source device 150.

FIG. 4 is a flow chart illustrating one embodiment of the method for autonomously updating firmware of source device 150 to authenticate newer sink devices, such as sink devices 184 and 186, that have second type handshake credentials. The process begins at initiator block 400 and proceeds to block 402, at which firmware update 145 is received via secure transmission from a trusted firmware provider, such as content provider 118 or source device manufacturer 120. The firmware update comprises new verification parameters, that is, KSV B 166 and PKey B 168, which are both derived or generated from a new secure proprietary resource, that is, new master key 114. At block 404, source device 150 updates existing firmware, including existing or original authentication firmware and gatekeeper logic, with the new verification parameters. At block 406, the new verification parameters are automatically stored within the secure, persistent storage of source device 150 along with the original authentication components, that is, KSV A 162 and PKey B 164. At block 408, original authentication firmware, that is, legacy authentication firmware 265, is updated with additional logic to form authentication firmware 170 and enable source device 150 to be able to authenticate newer sink devices, that is, sink devices having handshake credentials derived from the new master key 114, such as sink devices 184 and 186. Content delivery firmware 172 is also updated, at block 410, with additional gatekeeper logic to identify new content and content characteristics approved for transmission to only approved sink devices that have second type handshake credentials (sink devices 184 and 186). The updated features of authentication firmware and gatekeeper logic are automatically enabled, at block 412. In one embodiment, a restart of the source device may be triggered to enable these features. The process ends at block 414.

Referring now to FIG. 5, there is presented a flow chart illustrating the method by which the authentication handshake is completed between source device 150 and one or sink devices 180. The process of FIG. 5 begins at initiator block 500 and proceeds to block 502, at which logic associated with a communication interface 177, e.g., an HDMI interface, via which the source device 150 connects to one or more sink devices 180, receives handshake credentials from a connected sink device. The handshake credentials can be transmitted via, or as a part of, EDID, and includes KSV and PKey components derived from at least one master key. EDID can also provide device identifying data and information that indicates certain functional operating characteristics and/or limitations of the connected sink device. For example, the EDID can indicate the resolution supported by the sink device for displaying received content. The KSV and PKey components can be derived from at least one of the legacy master key 112 and the new master key 114, in one embodiment.

Responsive to detecting the connection with a sink device and/or to receiving the handshake credentials, the source device 150 activates a sink device handshake authentication protocol (block 504). The handshake authentication protocol authenticates whether the connected sink device is an approved sink device for connecting via the communication interface, i.e., whether the sink device is an approved device having verifiable handshake credentials derived from one of the authorized master keys 112, 114. At block 506, the handshake authentication protocol performs a verification of the handshake credentials received from the sink device by utilizing the authentication credentials stored in the one or more memory devices 260 of source device 150. In one embodiment, the authentication firmware 170 of source device 150 compares the sink device pair of KSV and PKey against the two sets of KSV and PKey combinations stored at the source device 150.

At block 508, authentication firmware 170 determines whether the sink device passes the handshake authentication, i.e., whether the handshake credentials provided by the sink device are verified as credentials originating from one of the authorized master keys 112, 114. If the sink device fails the handshake authentication, the source device 150 terminates the handshake authentication procedure and prevents any transmission of content to the sink device via communication interface 177 (block 510). The process then ends at block 520. However, if the connected sink device is authenticated as an approved sink device, then at block 512 authentication firmware 170 forwards authentication data to the content protection logic implemented by content delivery firmware 172 of source device 150, to indicate the sink device's type of authentication. Thus, in response to determining that the handshake credentials are an authorized set of authentication components, the content protection protocol, implemented by content delivery firmware 172, is initiated and determines, at block 514, a service level or tier authorized for the sink device, that is, whether the approved sink device was authenticated via a first tier authentication associated with the legacy version of the secure proprietary resource, that is, legacy master key 112, which authentication allows for limited access to content and content characteristics based on the sink device having second type handshake credentials derived from the legacy master key 112, or a second tier authentication associated with the newer version of the secure proprietary resource, that is, new master key 114, which authentication allows for full access to all content and content characteristics based on the sink device having second type handshake credentials derived from new master key 114. Source device 150, and in particular content delivery firmware 172, further stores, in register 270, an indication of the service tier authorized for the sink device 180, that is, an indication of a service level or tier authorized for, or the type of authentication associated with, the sink device.

If the sink device has been approved via second tier authentication, then the content protection logic activates all first tier functionality and approves the transmission of all content types and enables full content characteristics (block 516). However, if the sink device was not authenticated via second tier authentication, i.e., the sink device only received first tier authentication, then, at block 518, the content protection logic (content delivery firmware 172) limits the access of the sink device to content and content characteristics, that is, deactivates certain features and functionalities related to content transmission and enables transmission of only limited, such as legacy, content and content characteristics to the sink device, for example, wherein at least one of (a) content protected via the new version of the secure proprietary resource and (b) certain advanced features of all content are prevented from being transmitted to the sink device. The process then ends at block 520.

As presented herein, legacy content can refer to specific content that does not have special encoding that can only be decoded with a decoder that is activated by completion of the handshake authentication utilizing first type handshake credentials. For example, all content and features related to that content that are encoded using the new master key can only be transmitted to and/or outputted by a sink device that has handshake credentials derived from the new master key.

In one implementation, the sink device's handshake credentials are evaluated to determine a version number of the master key from which the connected sink device received its specific handshake credentials. Once the sink device has been approved by the authentication firmware, the authentication firmware forwards the master key version number to the content protection protocol. The content protection protocol allows content transmission only if a version number is received and the type of content and characteristics of that content can be forwarded to the approved sink device is also determined by the master key version number.

FIG. 6 presents a flow chart of the method by which the content delivery firmware 172 implementing the content protection protocol handles the transmission of content to an approved, connected sink device, in accordance with one embodiment. The method begins at block 600 and proceeds to block 602, at which source device 150 receives content that can be transmitted to a connected, approved sink device. The source device 150 can receive the content from a content provider 118 and/or from a readable medium inserted at/in the media reader 174. The source device 150 activates the content protection protocol, (block 604). The source device 150 parses the content and determines, from embedded data, a content type from among at least two different types of content (block 606). The type of content can refer to whether the content is approved for transmission to an approved legacy sink device that was approved utilizing first type handshake credentials or to an approved new or future sink device that was approved utilizing second type handshake credentials.

At block 608, source device 150 determines whether the content is a second type content requiring second type verification, that is, that the sink device be verified for transmission via second type handshake credentials. If the content does not require second type verification, source device 150 transmits the content to the sink device via HDMI interface 177 for presentation on the sink device (block 610). The process then ends at block 620. However, if the content does require the sink device be verified using the second type handshake credentials, source device 150 retrieves the sink device's verification level (block 612) and determines if the sink device was verified using the second type handshake credentials (block 614). Responsive to the sink device having been verified via the second type handshake credentials, source device 150 activates the full content characteristics and sets the source device to transmit all content types to the sink device (block 616). Otherwise, the content delivery firmware 172 of source device 150 prevents the content from being transmitted to the sink device (block 618). In one embodiment, the content delivery firmware can transmits only some content to the sink device, but with limited functionality associated with only legacy sink devices. Thus, the content protection protocol can modify the content to support only limited transmission of content and/or content characteristics are available at the sink device. The process ends at block 620.

From the above descriptions, the illustrative embodiments provide a source device comprising: a processor and a persistent storage having stored therein at least a first set of sink device verification parameters derived from a legacy version of a secure proprietary resource and a second set of sink device verification parameters derived from a newer version of the secure proprietary resource. The secure proprietary resource is utilized to enable the prevention of content transmission from the source device to a sink device that has not been authorized to receive such content. The source device further comprises: a first communication interface coupled to the processor by which one or more sink devices can connect to the source device and which receives, from a connected sink device, handshake credentials, including sink device identifying data, during an initial handshake with the connected sink device; and authentication firmware that executes on the processor and which performs the initial handshake with a connected sink device and, in response to receiving from the sink device a set of handshake credentials that include verifiable handshake data that was derived from at least one of the secure proprietary resource, automatically approves the connected sink device to receive content from the source device. The source device further comprises content delivery firmware that executes on the processor and which determines a service tier for content delivery to an approved, connected sink device based on the version of the secure proprietary resource from which the verified handshake data of the connected sink device was derived. At least one of (a) content protected via the new version of the secure proprietary resource and (b) certain advanced features of all content are prevented from being transmitted to the approved, connected sink device in response to the service tier for content delivery being a first service tier associated with the legacy version of the secure proprietary resource.

According to one embodiment, the secure proprietary resource is a high-bandwidth digital content protection (HDCP) master key and the sink device verification parameters comprise a key selector vector (KSV) and a private key (PKey) that is derived from one version of the HDCP master key. Also, the first set of sink device verification parameters and the second set of sink device verification parameters respectively comprise a first KSV and corresponding first PKey and a second KSV and corresponding second PKey. With this implementation, the authentication firmware, in response to receiving the handshake credentials from the connected sink device: parses the handshake credentials for a sink PKey, compares the sink PKey to a first PKey and a second PKey of the two sets of sink device verification parameters; and responsive to the sink PKey matching one of the first PKey and the second PKey, passes the sink device handshake and verifying the connected sink device as a verified and approved sink device, indicating to the content delivery firmware that the connected sink device is approved for content delivery, and communicates the HDCP master key version to the content delivery firmware to indicate which service tier to provide to the connected sink device.

In yet another embodiment, the handshake credentials of the sink device comprises an extended display identification data (EDID) and at least a sink PKey that is also derived from one version of the HDCP master key. The authentication firmware: automatically initiates the sink device handshake to verify the connected sink device responsive to detection of a connection of the sink device to the communication interface, receives, via the first communication interface, from the connected sink device, the handshake credentials comprising at least an EDID and the sink PKey, determines what master key version the sink PKey was derived from and configures the content delivery firmware to support for specific features of the sink device based on the determined master key version number. Then, responsive to the sink device failing to provide a verifiable sink PKey during the handshake, the content delivery firmware configures the source device to prevent content transmission from the source device to the sink device during the connection of the sink device to the communication interface.

In one implementation, responsive to the sink device failing to provide the verifiable handshake data during the handshake, the authentication firmware triggers the content delivery firmware to prevent content transmission from the source device to the sink device during the connection of the sink device to the communication interface. Also, in another implementation, in response to the authentication firmware verifying that the sink device is an approved sink device for receipt of content, the content delivery firmware configures the source device to support transmission of content to the connected sink device at the service tier at which the sink device was verified. Further, the content delivery firmware, responsive to the connected sink device being verified as an approved sink device: retrieves from the authentication firmware data indicating the version level of the secure proprietary resource; sets a register to indicate which service tier is authorized for the sink device; and responsive to the service tier corresponding to the legacy version of the secure proprietary resource, autonomously activates a gatekeeper function to limit transmission of certain types of content and of specific content features to the sink device.

In one embodiment, the source device comprises: a second communication interface at which the source device connects to a remote service for delivery of at least firmware updates; and logic associated with the authentication firmware that, responsive to receipt at the second communication interface, via secure transmission from a trusted firmware provider, of a firmware update that comprises an addition of one or more sink device verification parameters, automatically extends the authentication firmware to enable the firmware to support the one or more additional sink device verification parameters. When the secure proprietary resource is a HDCP master key, the firmware update comprises a next key selector vector (KSV) and a next private key (PKey) derived from a new HDCP master key, and the logic further: automatically stores the next KSV and PKey within the secure, persistent storage; updates the authentication firmware with additional logic to authenticate sink devices having handshake credentials derived from the new HDCP master key; and updates the content delivery firmware with content delivery firmware that identifies specific additional types of content and content features and characteristics that are approved for transmission to only sink devices with handshake credentials derived from that version of the HDCP master key.

In one embodiment in which the first communication interface is a HDMI, in response to the HDMI being connected to multiple approved sink devices via a repeater device, with at least a first connected sink device being approved for second tier content delivery service, while a second connected sink device is only approved for the first tier content delivery service, the content delivery firmware performs one of the following functions: provide second tier content delivery service to all connected sink devices, responsive to any one connected sink device being approved for second tier content delivery service; and provide only first tier content delivery service to the connected sink devices. The content delivery firmware thus enables provision of a complete second tier content delivery service for the first connected sink device only when that sink device is directly connected to the HDMI of the source device.

Additional embodiments can also include a method that performs the above processes within a source device. The method comprises: detecting when a sink device connects to the first communication interface; and in response to detecting a connected sink device, the processor of the source device executing the firmware and initiating a handshake authentication by which the source device verifies whether the connected sink device is an approved sink device for receiving content from the source device via the first communication interface. The handshake authentication comprises the processor verifying that handshake credentials received from the sink device for completing the handshake with the source device includes verifiable handshake data that was derived from one of at least two different versions of a secure proprietary resource that is utilized to enable a source device to restrict which sink devices can receive content from the source device. The method also comprises: responsive to the connected sink device being verified as an approved sink device to receive content via the first communication interface, the processor performs the function of determining a service tier for content delivery to the approved, connected sink device based on the version of the secure proprietary resource from which the verified handshake data of the connected sink device was derived. At least one of (a) content protected via a newer version of the secure proprietary resource and (b) certain advanced features of all content are prevented from being transmitted to the approved, connected sink device in response to the service tier for content delivery being a first service tier that is associated with a legacy version of the secure proprietary resource.

In one embodiment, the processor verifying that handshake credentials received from the sink device further comprises: retrieving a first set of sink device verification parameters derived from the legacy version of the secure proprietary resource; retrieving a second set of sink device verification parameters derived from the newer version of the secure proprietary resource; retrieving, from the received handshake credentials, the verifiable handshake data of the connected sink device; comparing the verifiable handshake data to at least one of the first set of sink device verification parameters and the second set of sink device verification parameters for a match; and responsive to the verifiable handshake data matching one of the sets of sink device verification parameters, automatically approving the connected sink device to receive content from the source device.

In another embodiment, the method further comprises: determining the service tier for content delivery to an approved sink device connected to the source device based on which of the first set and the second set of the sink device verification parameters matched the verifiable handshake data; and setting a service tier register within the source device to a value indicating the determined service tier that is to be utilized for all content delivery to the connected sink device. Also, the method comprises: responsive to the connected sink device having authentication credentials that support the source device providing a service tier corresponding to a legacy version of the secure proprietary resource, limiting content transmitted to the connected sink device to only a first type of content approved for general transmission to all authenticated sink devices. Further, responsive to the connected sink device having authentication credentials that support the source device providing a service tier corresponding to a new version of the secure proprietary resource, enabling a transmission of all content types to the connected sink device and providing support for all content features available at the sink device. Finally, the method comprises preventing transfer of any content from the source device to the sink device in response to the connected sink device not being verified as an approved sink device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A source device comprising:
    a processor;
    a persistent storage having stored therein at least a first set of sink device verification parameters derived from a legacy version of a secure proprietary resource and a second set of sink device verification parameters derived from a newer version of the secure proprietary resource, wherein the secure proprietary resource is utilized to enable the prevention of content transmission from the source device to a sink device that has not been authorized to receive such content;
    a first communication interface coupled to the processor by which one or more sink devices can connect to the source device and which receives, from a connected sink device, handshake credentials, including sink device identifying data, during an initial handshake with the connected sink device;
    authentication firmware that executes on the processor and which performs the initial handshake with a connected sink device and, in response to receiving from the sink device a set of handshake credentials that include verifiable handshake data that was derived from at least one of the secure proprietary resource, automatically approves the connected sink device to receive content from the source device; and
    content delivery firmware that executes on the processor and which determines a service tier for content delivery to an approved, connected sink device based on the version of the secure proprietary resource from which the verified handshake data of the connected sink device was derived;
    wherein at least one of (a) content protected via the new version of the secure proprietary resource and (b) certain advanced features of all content are prevented from being transmitted to the approved, connected sink device in response to the service tier for content delivery being a first service tier associated with the legacy version of the secure proprietary resource.

2. The source device of claim 1, wherein the secure proprietary resource is a high-bandwidth digital content protection (HDCP) master key and the sink device verification parameters comprise a key selector vector (KSV) and a private key (PKey) that is derived from one version of the HDCP master key.

3. The source device of claim 2, wherein:
    the first set of sink device verification parameters and the second set of sink device verification parameters respectively comprises a first KSV and corresponding first PKey and a second KSV and corresponding second PKey;

the authentication firmware, in response to receiving the handshake credentials from the connected sink device: parses the handshake credentials for a sink PKey, compares the sink PKey to a first PKey and a second PKey of the two sets of sink device verification parameters; and responsive to the sink PKey matching one of the first PKey and the second PKey, approves the sink device handshake and verifies the connected sink device as a verified and approved sink device, indicating to the content delivery firmware that the connected sink device is approved for content delivery, and communicates the HDCP master key version to the content delivery firmware to indicate which service tier to provide to the connected sink device.

4. The source device of claim 2, wherein:

the handshake credentials of the sink device comprises an extended display identification data (EDID) and at least a sink PKey that is also derived from one version of the HDCP master key; and the authentication firmware: automatically initiates the sink device handshake to verify the connected sink device responsive to detection of a connection of the sink device to the communication interface, receives, via the first communication interface, from the connected sink device, the handshake credentials comprising at least an EDID and the sink PKey, determines what master key version the sink PKey was derived from and configures the content delivery firmware to support for specific features of the sink device based on the determined master key version number; and responsive to the sink device failing to provide a verifiable sink PKey during the handshake, the content delivery firmware configures the source device to prevent content transmission from the source device to the sink device during the connection of the sink device to the communication interface.

5. The source device of claim 1, further comprising:

responsive to the sink device failing to provide the verifiable handshake data during the handshake, the authentication firmware triggers the content delivery firmware to prevent content transmission from the source device to the sink device during the connection of the sink device to the communication interface.

6. The source device of claim 1, further comprising:

in response to the authentication firmware verifying that the sink device is an approved sink device for receipt of content, the content delivery firmware configures the source device to support transmission of content to the connected sink device at the service tier at which the sink device was verified.

7. The source device of claim 6, further comprising:

the content delivery firmware, responsive to the connected sink device being verified as an approved sink device: retrieves from the authentication firmware data indicating the version level of the secure proprietary resource; sets a register to indicate which service tier is authorized for the sink device; and responsive to the service tier corresponding to the legacy version of the secure proprietary resource, autonomously activates a gatekeeper function to limit transmission of certain types of content and of specific content features to the sink device.

8. The source device of claim 1, further comprising:

a second communication interface at which the source device connects to a remote service for delivery of at least firmware updates; and logic associated with the authentication firmware that, responsive to receipt at the second communication interface, via secure transmission from a trusted firmware provider, of a firmware update that comprises an addition of one or more sink device verification parameters, automatically extends the authentication firmware to enable the firmware to support the one or more additional sink device verification parameters;

wherein, when the secure proprietary resource is one or more? HDCP master keys, the firmware update comprises at least one next key selector vectors? (KSV) and at least one next private key (PKey) derived from a new HDCP master key, and the logic further: automatically stores the next KSV and PKey within the secure, persistent storage; updates the authentication firmware with additional logic to authenticate sink devices having handshake credentials derived from the new HDCP master key; and updates the content delivery firmware with content delivery firmware that identifies specific additional types of content and content features and characteristics that are approved for transmission to only sink devices with handshake credentials derived from that version of the HDCP master key.

9. The source device of claim 1, wherein the first communication interface is a high definition multimedia interface (HDMI).

10. The source device of claim 9, wherein in response to the HDMI being connected to multiple approved sink devices via a repeater device, with at least a first connected sink device being approved for second tier content delivery service, while a second connected sink device is only approved for the first tier content delivery service, the content delivery firmware performs one of the following functions:

provide second tier content delivery service to all connected sink devices, responsive to any one connected sink device being approved for second tier content delivery service; and provide only first tier content delivery service to all connected sink devices, and enable provision of a complete second tier content delivery service for the first connected sink device only when the sink device is directly connected to the HDMI of the source device.

11. In a source device with a processor, secure persistent storage having firmware, and a first communication interface, a method comprising:

detecting when a sink device connects to the first communication interface;

in response to detecting a connected sink device, the processor executing the firmware and initiating a handshake authentication by which the source device verifies whether the connected sink device is an approved sink device for receiving content from the source device via the first communication interface;

wherein the handshake authentication comprises the processor verifying that handshake credentials received from the sink device for completing the handshake with the source device includes verifiable handshake data that was derived from one of at least two different versions of a secure proprietary resource that is utilized to enable a source device to restrict which sink devices can receive content from the source device;

responsive to the connected sink device being verified as an approved sink device to receive content via the first communication interface, the processor performs the function of determining a service tier for content delivery to the approved, connected sink device based on the version of the secure proprietary resource from which the verified handshake data of the connected sink device was derived;

wherein at least one of (a) content protected via a newer version of the secure proprietary resource and (b) certain advanced features of all content are prevented from being transmitted to the approved, connected sink device in response to the service tier for content delivery being a first service tier that is associated with a legacy version of the secure proprietary resource.

12. The method of claim 11, wherein the processor verifying that handshake credentials received from the sink device further comprises:

retrieving a first set of sink device verification parameters derived from the legacy version of the secure proprietary resource;

retrieving a second set of sink device verification parameters derived from the newer version of the secure proprietary resource;

retrieving, from the received handshake credentials, the verifiable handshake data of the connected sink device;

comparing the verifiable handshake data to at least one of the first set of sink device verification parameters and the second set of sink device verification parameters for a match; and responsive to the verifiable handshake data matching one of the sets of sink device verification parameters, automatically approving the connected sink device to receive content from the source device.

13. The method of claim 12, further comprising:

determining the service tier for content delivery to an approved sink device connected to the source device based on which of the first set and the second set of the sink device verification parameters matched the verifiable handshake data; and setting a service tier register within the source device to a value indicating the determined service tier that is to be utilized for all content delivery to the connected sink device.

14. The method of claim 11, further comprising:

responsive to the connected sink device having authentication credentials that support the source device providing a service tier corresponding to a legacy version of the secure proprietary resource, limiting content transmitted to the connected sink device to only a first type of content approved for general transmission to all authenticated sink devices; and responsive to the connected sink device having authentication credentials that support the source device providing a service tier associated with a new version of the secure proprietary resource, enabling a transmission of all content types to the connected sink device and providing support for all content features available at the sink device; and preventing transfer of any content from the source device to the sink device in response to the connected sink device not being verified as an approved sink device.

15. The method of claim 11, wherein:

the secure proprietary resource is a high-bandwidth digital content protection (HDCP) master key and the sink device verification parameters comprise a key selector vector (KSV) and a private key (PKey) that is derived from one version of the HDCP master key;

the first set of sink device verification parameters and the second set of sink device verification parameters respectively comprise a first KSV and corresponding first PKey and a second KSV and corresponding second PKey; and the processor, in response to receiving the handshake credentials from the connected sink device: parses the handshake credentials for a sink PKey, compares the sink PKey to a first PKey and a second PKey of the two sets of sink device verification parameters; and responsive to the sink PKey matching one of the first PKey and the second PKey, passing the sink device handshake and verifying the connected sink device as a verified and approved sink device, and configuring the source device to support transmission of content to the connected sink device at the service tier at which the sink device was verified by: indicating to content delivery firmware that the connected sink device is approved for content delivery, and communicating the HDCP master key version to the content delivery firmware to indicate which service tier to provide to the connected sink device.

16. The method of claim 15, wherein:

the handshake credentials of the sink device comprises an extended display identification data (EDID) and at least a sink PKey that is also derived from one version of the HDCP master key; and the method further comprises:

automatically initiating the sink device handshake to verify the connected sink device responsive to detection of a connection of the sink device to the communication interface;

receiving, via the first communication interface, from the connected sink device, the handshake credentials comprising at least an EDID and the sink PKey;

determining what master key version the sink PKey was derived from and enabling support for specific features of the sink device based on the determined master key version number; and responsive to the sink device failing to provide a verifiable sink PKey during the handshake, triggering the content delivery firmware to prevent content transmission from the source device to the sink device during the connection of the sink device to the communication interface.

17. The method of claim 15, further comprising:

responsive to the connected sink device being verified as an approved sink device: retrieving data indicating the version level of the secure proprietary resource; setting a register to indicate which service tier is authorized for the sink device; and responsive to the service tier corresponding to the legacy version of the secure proprietary resource, autonomously activating a gatekeeper function to limit transmission of certain types of content to and restrict access to specific content features at the sink device.

18. The method of claim 11, wherein:

the source device comprises a second communication interface at which the source device connects to a remote service for delivery of one or more firmware updates; and the method further comprising: receiving a firmware update at the second communication interface, via secure transmission from a trusted firmware provider, wherein the firmware update comprises additional sink device verification parameters; and responsive to receipt of the firmware update, automatically extending the authentication firmware to enable the firmware to support the additional sink device verification parameters;

wherein, when the secure proprietary resource is a HDCP master key, the firmware update comprises a next key selector vector (KSV) and a next private key (PKey) derived from a new HDCP master key, and the logic further: automatically stores the next KSV and PKey within the secure, persistent storage; updates the authentication firmware with additional logic to authenticate sink devices having handshake credentials derived from the new HDCP master key; and updates the content delivery firmware with content delivery firmware that identifies specific additional types of content and content features and characteristics that are approved for transmission to only sink devices with handshake credentials derived from that version of the HDCP master key.

19. The method of claim 11, wherein the first communication interface is a high definition multimedia interface (HDMI).

20. The method of claim 19, wherein in response to the HDMI being connected to multiple approved sink devices via a repeater device, with at least a first connected sink device being approved for second tier content delivery service, while a second connected sink device is only approved for the first tier content delivery service, the content delivery firmware performs one of the following functions:

provide second tier content delivery service to all connected sink devices, responsive to any one connected sink device being approved for second tier content delivery service; and provide only first tier content delivery service to at least the second connected sink device, and enable provision of a complete second tier content delivery service for the first connected sink device only when the sink device is directly connected to the HDMI of the source device.

* * * * *